UNITED STATES PATENT OFFICE.

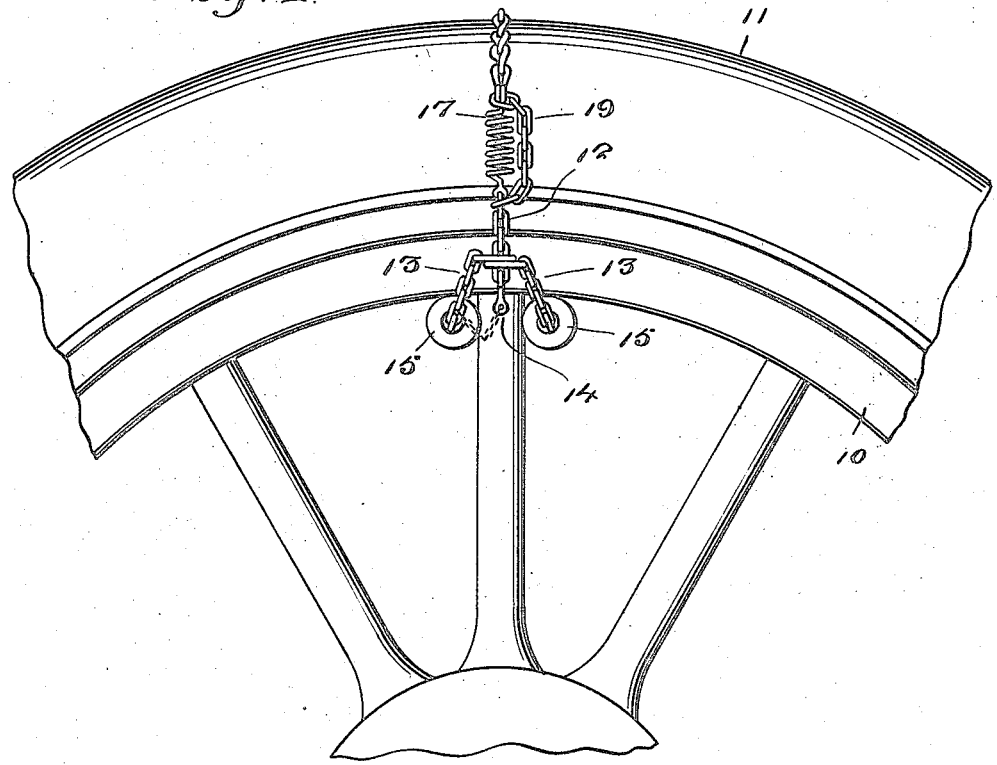
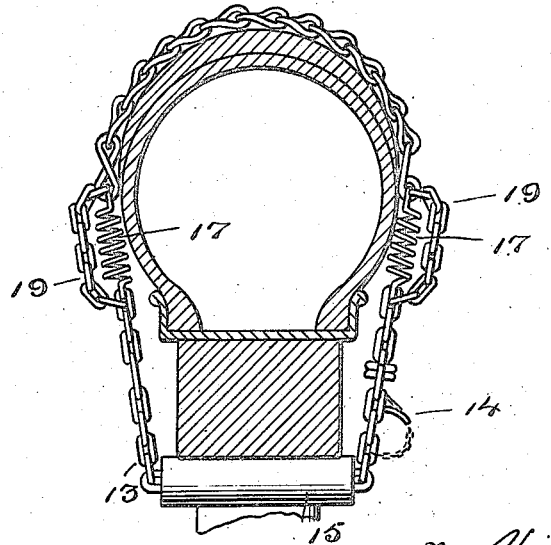

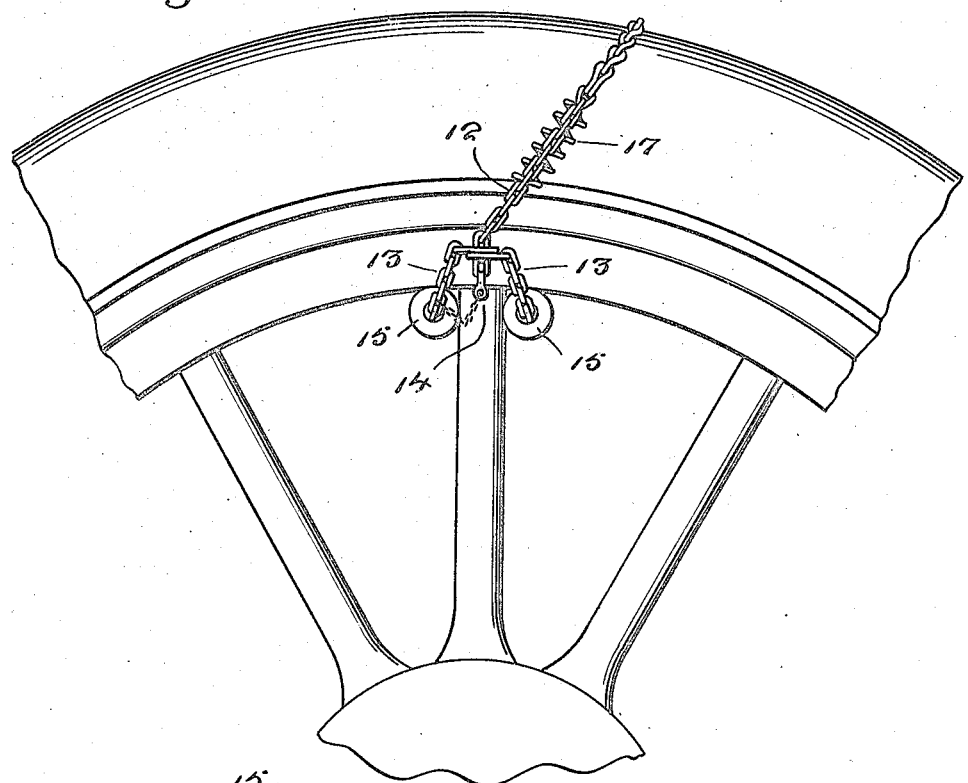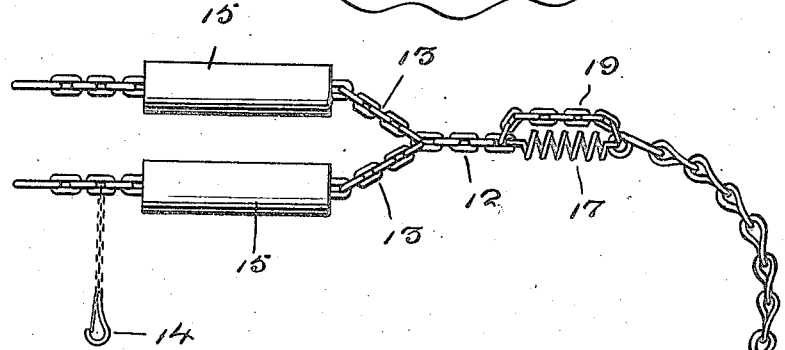

LOUIS C. STUKENBORG, OF MEMPHIS, TENNESSEE.

TIRE CHAIN.

1,423,470. Specification of Letters Patent. Patented July 18, 1922.

Application filed August 30, 1921. Serial No. 496,811.

*To all whom it may concern:*

Be it known that I, LOUIS C. STUKENBORG, a citizen of the United States of America, residing at Memphis, in the county of Shelby and State of Tennessee, have invented new and useful Improvements in Tire Chains, of which the following is a specification.

This invention comprehends the provision of an anti-skid attachment for automobile wheels or the like, in the nature of a chain adapted to extend across the tread of the tire with its ends associated with the spokes of the wheel for holding the chain in proper position for use.

The chief characteristic of the present invention resides in equipping the chain with a pair of springs, each spring being terminally connected with the chain at spaced points to provide a slack in the chain when the wheel is not in motion, the springs being positioned to gradually take up any undue strain or pull to which the chain might be subjected to, incident to fast driving or turning corners, thus preventing the chain from being broken by sudden jerks or pulls thereon.

The nature and advantages of the invention will be better understood when the following detailed description is read in connection with the accompanying drawings, the invention residing in the construction, combination and arrangement of parts as claimed.

In the drawings forming part of this application, like numerals of reference designate similar parts in the several views, and wherein:—

Figure 1 is a fragmentary side elevation of an automobile wheel showing one of the tire chains associated therewith.

Figure 2 is an enlarged transverse sectional view showing the normal position of one chain and its spring.

Figure 3 is a view similar to Figure 1 showing the arrangement of the springs when the chain is subjected to undue strain or pull.

Figure 4 is a plan view of one of the chains.

Referring to the drawings, in detail, 10 designates an automobile wheel of the usual construction, while 11 represents the usual pneumatic tire. The attachment forming the subject matter of the present invention comprises a chain 12, from one end of which extend the branches 13. This chain is of a length to extend about the tire and the felly of the wheel as clearly illustrated in Figure 2. The branches 13 are adapted to surround the adjacent spoke of the wheel, and these branches are secured together through the instrumentality of a snap hook 14. A sleeve 15 of rubber or other suitable material surrounds each branch 13 of the chain to prevent the spoke from being scratched or otherwise marred as will be readily understood.

With each chain, I make use of a pair of springs 17, and each spring has its end secured to the chain at spaced points, in a manner to provide for a slackness indicated at 18 when the wheel is not in motion. When the chain is positioned upon the wheel, these springs 17 are arranged at opposite sides of the tread of the tire, and in their normal condition provide for a slackness as clearly shown in Figure 2. When the machine is travelling at a reasonably fast rate of speed, there is considerable pull exerted upon each chain, which pull is gradually taken up by the springs before the pull is transmitted to the chain, thus preserving the chain from breakage which would obviously result should the chain be subjected to any sudden jerk or pull of an aggravated nature. When the springs 17 are used in the manner as stated, the springs are extended as illustrated in Figure 3, and these springs are extened to approximately their limit before the slack in the chain is taken up. The springs are functioned for the purpose above mentioned when the machine turns a corner, which places a lateral strain upon one or the other end of the chain. The invention is very simple in construction, and can be manufactured and sold at a very nominal cost.

While it is believed that from the foregoing description, the nature and advantages of the invention will be better understood, I desire to have it understood that I do not limit myself to what is herein shown and described and that such changes may be resorted to when desired as fall within the scope of what is claimed.

What I claim is:

An anti-skid attachment for automobile wheels comprising a chain adapted to extend transversely over the tread of the tire, branches projecting from one end of the chain, sleeve-like members of yieldable material carried by said branches, a short chain suspended from one of said branches, a snap hook carried by the short chain and adapted to secure said branches to the other end of the chain proper, said branches being arranged at the opposite sides of the spoke of the wheel, with said sleeve-like member engaging said spoke, a coiled spring arranged at each side of the wheel, and each spring having its terminals secured to the chain at spaced points to provide a slack in the chain at the opposite sides of the wheel for the purpose specified.

In testimony whereof I affix my signature.

LOUIS C. STUKENBORG.